US006785647B2

(12) United States Patent
Hutchison (10) Patent No.: US 6,785,647 B2
(45) Date of Patent: Aug. 31, 2004

(54) SPEECH RECOGNITION SYSTEM WITH NETWORK ACCESSIBLE SPEECH PROCESSING RESOURCES

(76) Inventor: William R. Hutchison, Applied Behavior Systems 2227 Canyon Blvd., Apt. 258, Boulder, CO (US) 80302

( * ) Notice: Subject to any disclaimer, the term of this patent is extended or adjusted under 35 U.S.C. 154(b) by 518 days.

(21) Appl. No.: 09/838,973

(22) Filed: Apr. 20, 2001

(65) Prior Publication Data

US 2002/0156626 A1 Oct. 24, 2002

(51) Int. Cl.[7] .............................................. G10L 15/06
(52) U.S. Cl. .................... 704/231; 704/270; 704/270.1; 704/201; 704/273; 379/88.01
(58) Field of Search ................................. 704/257, 235, 704/273, 243, 240, 246, 231, 201, 270, 270.1; 371/88.01

(56) References Cited

U.S. PATENT DOCUMENTS

| | | | |
|---|---|---|---|
| 5,475,792 A | | 12/1995 | Stanford et al. |
| 5,638,425 A | * | 6/1997 | Meador et al. .......... 379/88.01 |
| 5,664,058 A | * | 9/1997 | Vysotsky .................... 704/243 |
| 5,802,251 A | | 9/1998 | Cohen et al. |
| 6,021,387 A | | 2/2000 | Mozer et al. |
| 6,092,045 A | | 7/2000 | Stubley et al. |
| 6,163,769 A | | 12/2000 | Acero et al. |
| 6,246,987 B1 | * | 6/2001 | Fisher et al. ................. 704/273 |
| 6,366,882 B1 | * | 4/2002 | Bijl et al. .................... 704/235 |
| 6,519,562 B1 | * | 2/2003 | Phillips et al. .............. 704/240 |
| 6,633,846 B1 | * | 10/2003 | Bennett et al. ............. 704/257 |
| 2001/0013001 A1 | * | 8/2001 | Brown et al. ............. 704/270.1 |
| 2001/0055370 A1 | * | 12/2001 | Van Kommer ........... 379/88.01 |
| 2002/0072916 A1 | * | 6/2002 | Friedman ................. 704/270.1 |
| 2002/0091527 A1 | * | 7/2002 | Shiau ....................... 704/270.1 |

OTHER PUBLICATIONS

Nobuo Hataoka, et al., "Speech Recognition System for Automatic Telephone Operator based on CSS Architecture," 2nd IEEE Workshop on Interactive Voice Technology for Telecommunications Applications (IVTT94), pp 77–80, Kyoto Research Park, Kyoto, Japan, Sep. 26–27, 1994.
Simon Dobrisek, et al. "HOMER: a Voice–Driven Text–to–Speech System for the Blind," University of Ljubljana, Faculty of Electrical Engineering, pp 205–2–8, Trzaska, SI–100 Ljubljana, Solvenia 1999.
International Search Reaport, PCT/US02/12574, Jun. 6, 2002.

* cited by examiner

*Primary Examiner*—Susan McFadden
(74) *Attorney, Agent, or Firm*—Stuart T. Langley; Hogan & Hartson LLP (57) ABSTRACT

A method of speech recognition including receiving speech signals into a front-end processor and storing at least some resources used for speech recognition in a network-attached server. The front-end processor is coupled to the network-attached server to perform the speech recognition.

28 Claims, 5 Drawing Sheets

SPEECH RECOGNITION SYSTEM WITH NETWORK ACCESSIBLE SPEECH PROCESSING RESOURCES

BACKGROUND OF THE INVENTION

1. Field of the Invention.

The present invention relates, in general, to voice recognition, and, more particularly, to software, systems, software and methods for performing voice and speech recognition over a distributed network.

2. Relevant Background

Voice and speech recognition systems are increasingly common interfaces for obtaining user input into computer systems. Speech recognition is used to provide enhanced services such as interactive voice response (IVR), automated phone attendants, voice mail, fax mail, and other applications. More sophisticated speech recognition systems are used for speech-to-text conversion systems used for dictation and transcription.

Voice and speech recognition systems are characterized by, among other things, their recognition accuracy, speed and vocabulary size. High speed, accurate, large vocabulary systems tend to be complex and so require significant computing resources to implement. Moreover, such systems have increased training demands to develop accurate models of users' speech patterns. In applications where computing resources are limited or the ability to train to a particular user's speech patterns is limited, speech recognition products tend to be slow and/or inaccurate. Currently, speech recognition enabled software applications must often compromise between complex but accurate solutions, or simple but less accurate solutions. In many applications, however, the impracticality of meaningful training dictates that the application can only implement less accurate techniques.

Voice recognition is of two basic types, speaker-dependent and speaker-independent. A speaker dependent system operates in environments where the system has relatively frequent contact with each speaker, where sizable vocabularies are involved, and where the cost of recognition errors is high. These systems are usually easier to develop, cheaper to buy and more accurate, but not as flexible as speaker-adaptive or speaker-independent systems. In a speaker-dependent system, a user trains the system by, for example, providing speech samples and creating a correlation between the samples and text of what was provided, usually with some manual effort on the part of the speaker. Such systems often use a generic engine coupled with substantial data files, called voice models, that characterize a particular speaker for which the system has been trained. The training process can involve significant effort to obtain high recognition rates. Moreover, the voice model files are tightly coupled to the recognition software so that it is difficult to port the training investment to other hardware/software platforms.

A speaker independent system operates for any speaker of a particular type (e.g. American English). These systems are the most difficult to develop, most expensive and accuracy is lower than speaker dependent systems. However, they are highly useful in a wide variety of applications where many users must use the system such as answering services, interactive voice response (IVR) systems, call processing centers, data entry and the like. Such applications sacrifice the accuracy of speaker-dependent systems for the flexibility of enabling a heterogeneous group of speakers to use the system. Such applications are characterized in that high recognition rates are desirable, but the cost of recognition failure is relatively low.

A middle ground is sometimes defined as a speaker adaptive system. A speaker adaptive system dynamically adapts its operation to the characteristics of new speakers. These systems are more akin to speaker-dependent models, but allow the system to be trained over time. Adaptive systems can improve their vocabulary over time and result in complex, but accurate speech models. Such systems still require significant training effort, however. As in speaker-dependent systems, the complex speech models cannot be readily ported to other systems.

Training methods tend to be very product specific. Moreover, the data structures in which the relationships between a user's speech and text are correlated tend to be product specific. Hence, the significant training effort applied to a first speech recognition program may not be reusable for any other program or system. In some cases, speakers must re-train systems between version updates of the same program. Temporary or permanent changes to a user's voice patterns affect performance and may require retraining. This significant training burden and lack of portability between products has worked against wide scale adoption of speech recognition systems.

Moreover, even where a user has trained one or more speaker-dependent systems, this training effort cannot be leveraged to improve the performance of the many speaker-independent systems that are encountered. The speaker-independent systems cannot, by design, access or use speaker-dependent speech models to improve their performance. Hence, a need exists for improved speech recognition systems, software and methods that enable portable speech models that can be used for a wide variety of tasks and leverage the training efforts across a wide variety of systems.

The dichotomy between speaker-dependent and speaker-independent technologies has resulted in an interesting dilemma in industry. Many of the applications that could benefit most from accurate speech recognition (e.g., interactive voice response systems) cannot afford the complexity of highly accurate speaker dependent systems, nor obtain the necessary voice models that would improve their accuracy. From a practical perspective, speakers will only invest the significant time required to develop a high quality voice model in applications where the result is worth the effort. The benefits realized by a business cannot compel individual speakers to submit to the necessary training regimens. Hence, these applications settle for speaker-independent solutions and invest heavily in improving the performance of such systems.

Increasingly, computer-implemented applications and services are targeting "thin clients" or computers with limited processing power and data storage capacity. Such devices are cost effective means of implementing user interfaces. Thin clients are becoming prominent in appliances such as televisions, telephones, Internet terminals and the like. However, the limited computing resources make it difficult to implement complex functionality such as voice and speech recognition. A need exists for voice processing systems, methods and software that can provide high quality voice processing services with reduced hardware requirements.

In the past, computers were used by one user, or perhaps a few users, to access a limited set of applications. As computers are used more frequently to provide interfaces to everyday appliances, the need to adapt user interfaces to multiple users becomes more pressing. Voice processing, in particular, represents a user input mode that is difficult to adapt to multiple users. In current systems, a voice model must be developed on and stored in each machine for each user. Not only does this tax the machine's resources, but it creates a burdensome need for each user to train each computer that they use.

Conversely, each user tends to access computer resources via a variety of computer-implemented interfaces and computing hardware. It is contemplated that any given user may wish to access voice-enabled television, voice-enabled software on a personal computer, voice-enabled automobile controls, and the like. The effort to train and maintain each of these systems individually becomes significant with only a few applications, and prohibitive with the large number of applications that could potentially become voice enabled.

Hence, a need exists for speech recognition systems, methods and software that provide increased accuracy with reduced cost. Moreover, there is a need for systems that require reduced effort on the part of the speaker. Further, a need for systems and software that enable users to leverage training effort across multiple, disparate speech-recognition enabled applications exists.

SUMMARY OF THE INVENTION

Briefly stated, the present invention involves a speech recognition system in which one or more speaker-dependent voice signatures are developed for each of a plurality of speakers. A plurality of configurable speech processing engines are deployed and integrated with computer applications. A session is initiated between the configurable engine and a particular speaker. The configurable engine identifies the user using voice recognition or other explicit or implicit user-identification methods. The configurable engine accesses a copy of the speaker dependent voice signature associated with the identified speaker to perform speaker-dependent speech recognition.

In another aspect, the present invention involves voice signatures that are configured to integrate with and be used by a plurality of disparate voice-enabled applications. The voice signature comprises a static data structure or a dynamically adapting data structure that represents a correlation between a speaker's voice patterns and language constructs. The voice signature is preferably portable across multiple computer hardware and software platforms. Preferably, a plurality of voice signatures are stored in a network accessible repository for access by voice-enabled applications as needed.

DETAILED DESCRIPTION OF THE PREFERRED EMBODIMENTS

The present invention is directed to voice processing systems characterized by a number of distinct aspects. In general, the systems and methods of the present invention intends to reduce the burden on users and developers of speech recognition systems by enabling training files and voice models to be readily shared between disparate applications. Further, initial training and voice model adaptation can be implemented with greater efficiency by sharing voice information across multiple disparate applications.

In one aspect, the present invention provides a "voice processing substrate" or "voice processing service" upon which other software applications can build. By providing high quality voice recognition and speech recognition services ubiquitously, existing software applications can become "voice-enabled" with significantly lower development cost. Moreover, applications that would not have been practical heretofore due to the high cost and proprietary nature of voice recognition software, are made viable by the distributed and highly portable and scaleable nature of the present invention.

In another aspect, the present invention involves applications of the voice processing service such as interactive voice response, dictation and transcription services, voice messaging services, voice automated application services, and the like that share a common repository of speech recognition resources. These applications, typically implemented as software applications, can leverage the aggregate knowledge about their user's voice and speech patterns by using the shared common speech recognition resources.

In yet another aspect the present invention involves a distributed voice processing system in which the various functions involved in voice processing can be performed in a pipelined or parallel fashion. Speech tasks differ significantly in purpose and complexity. In accordance with this aspect of the present invention, the processes involved in speech processing are modularized and distributed amongst a number of processing resources. This enables the system to employ only the required resources to complete a particular task. Also, this enables the processes to be implemented in parallel or in a pipelined fashion to greatly improve overall performance.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

Figure 1:
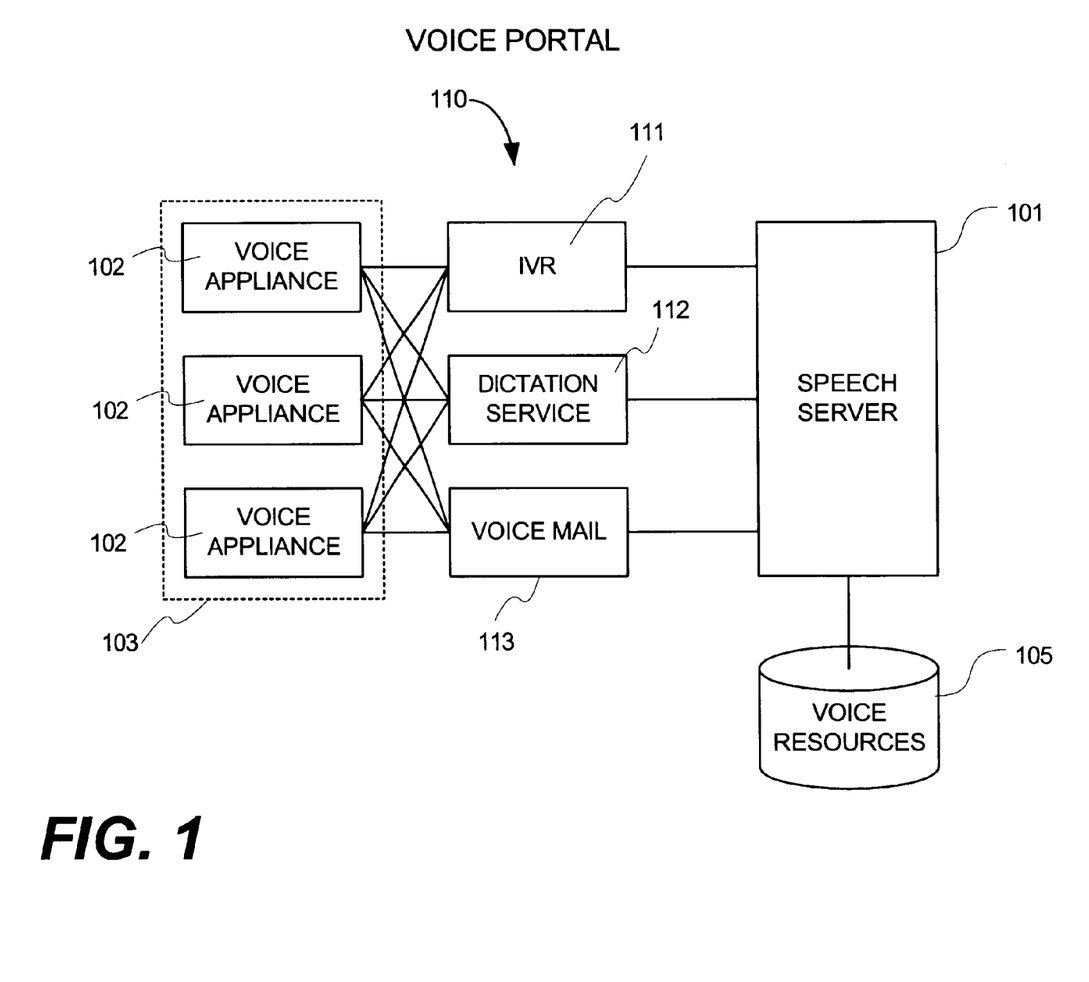
FIG. 1 shows a computer environment in which the present invention is implemented.

FIG. 1 shows an exemplary computing environment 100 in which the present invention may be implemented. Speech server 101 comprises program and data constructs that function to receive requests from a variety of sources, access voice resources 105, and provide voice services in response to the requests. The provided voice services involve accessing stored voice resources 105 that implement a central repository of resources that can be leveraged to provide services for a wide variety of requests. The services provided by speech server 101 may vary in complexity from simply retrieving specified voice resources (e.g., obtaining a speech sample file for a particular user) to more complex speech recognition processes (e.g., feature extraction, phoneme recognition, phoneme-to-text mapping).

Requests to speech server 101 may come directly from voice appliances 102, however, in preferred examples requests come from "voice portals" 110. Voice portals comprise software applications and/or software servers that provide a set of fundamental behaviors and that are voice enabled by way of their coupling to speech server 101. Example voice portals include interactive voice response (IVR) services 111, dictation service 112 and voice mail service 113. However, the number and variety of applications and services that can be voice-enabled in accordance with the present invention is nearly limitless. Because voice portals 110 access shared speech server 101 and shared voice resources 105, they do not each need to create, obtain, or maintain duplicate or special-purpose instances of the voice resources. Instead, the voice portals can focus on implementing the logic necessary to implement their fundamental behaviors, effectively outsourcing the complex tasks associated with voice processing.

A set 103 of voice appliances 102 represent the hardware and software devices used to implement voice-enabled user interfaces. Exemplary voice appliances 102 include, but are not limited to, personal computers with microphones or speech synthesis programs, telephones, cellular telephones, voice over IP (VoIP) terminals, laptop and hand held computers, computer games and the like. Any given speaker may use a plurality of voice appliances 102. Likewise, any given voice appliance 102 may be used by multiple speakers.

A variety of techniques are used to perform voice processing. Typically speech recognition starts with the digital sampling of speech followed by acoustic signal processing. Most techniques include spectral analysis such as Fast Fourier Transform (FFT) analysis, LPC analysis (Linear Predictive Coding), MFCC (Mel Frequency Cepstral Coefficients), cochlea modeling and the like. Using phoneme recognition, the preprocessed files are parsed to identify groups of phonemes and words using techniques such as DTW (Dynamic Time Warping), HMM (hidden Markov modeling), NNs (Neural Networks), expert systems, N-grams and combinations of techniques. Most systems use some knowledge of the language (e.g., syntax and context) to aid the recognition process.

The precise distribution of functionality amongst the various components shown in FIG. 1 can vary significantly. Modularization of components allows components to be placed or implemented rationally within the network architecture. For example, analog-to-digit conversion (ADC) and digital signal processing (DSP) steps may occur within voice appliances 102 such that a digital preprocessed signal is communicated to voice portals 110. Alternatively, this preprocessing can be performed by voice portals 110, or can be out-sourced to speech server 101. In many applications it is preferable to perform these preprocessing functions as near to the analog voice source (e.g., the speaker) as possible to avoid signal loss during communication. Conversely, it is contemplated that copies of shared voice resources can be stored permanently or temporarily (i.e., cached) within voice portals 111 and/or voice appliances 102 so that more complex functions can be implemented without access to speech server 101 each instance.

Each of the devices shown in FIG. 1 may include memory, mass storage, and a degree of data processing capability sufficient to manage their connection to a network. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figures 2, 3:
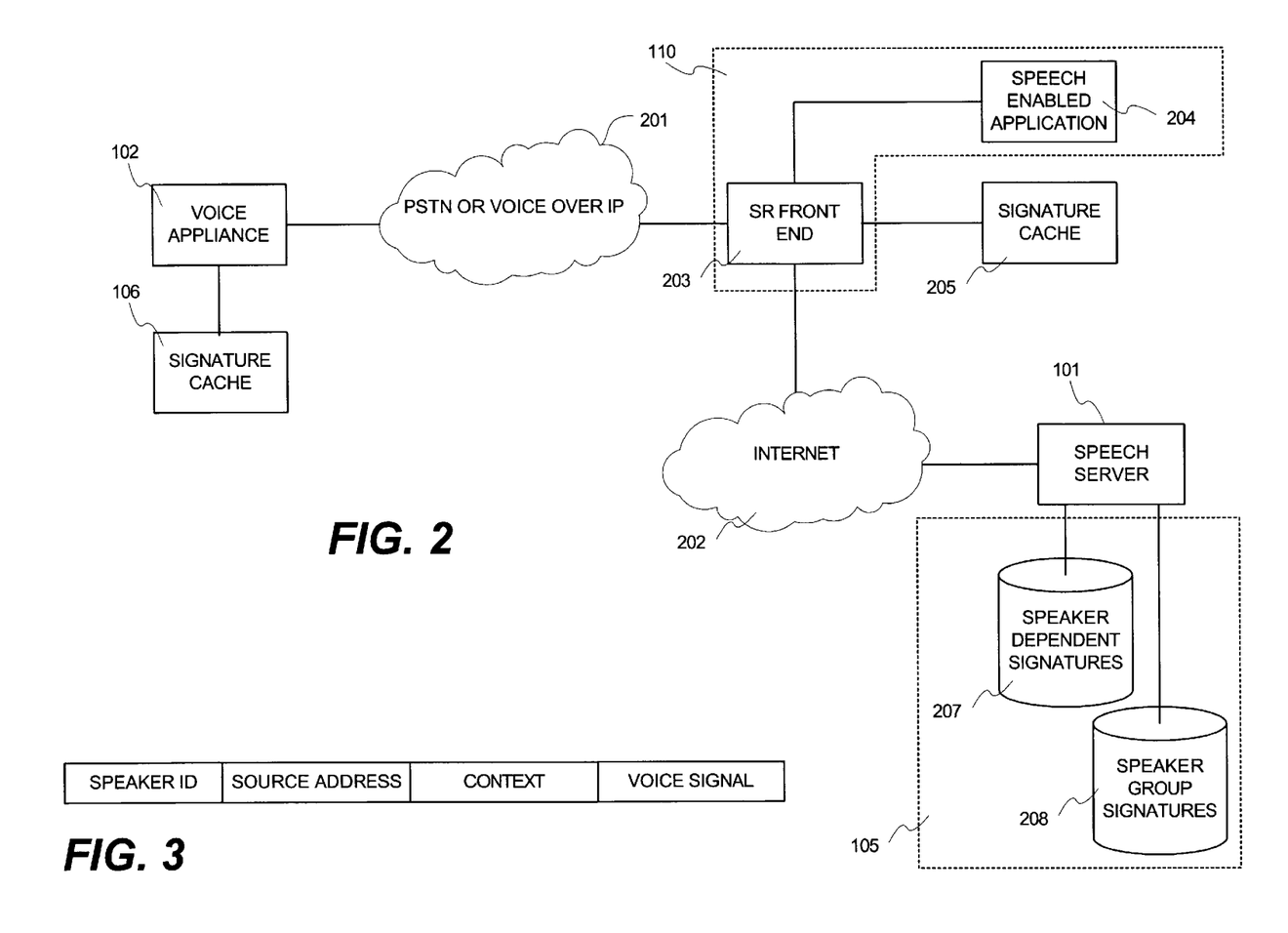
FIG. 2 shows entities and relationships in a particular embodiment of the present invention.
FIG. 3 illustrates an exemplary packet structure in accordance with an embodiment of the present invention.

FIG. 2 shows conceptual relationships between entities in a specific embodiment of the present invention. Voice appliance 102 interacts with a speaker and communicates a voice signal over network 201 to voice portal 110. The term "voice signal" is intended to convey a very broad range of signals that capture the voice utterances of a user in analog or digital form and which indicate an identity of the speaker. The speaker identification can be to a specific individual speaker, or an indication of a group to which the speaker belongs (e.g., English-speaking children from Phoenix, Ariz.). The speaker identification can take a variety of forms, and may be explicitly provided by the speaker or voice appliance 102 or implied from the connection through network 201 using techniques such as caller ID, area code information, or reverse telephone directory lookup.

Network 201 may comprise the public switched telephone network (PSTN) including cellular phone networks, as well as local area networks (LANs), wide area networks (WANs), metropolitan area networks (MANs), as well as public internetworks such as the Internet. Any network or group of networks that are capable of transporting the voice signal and speaker identification information are suitable implementations of network 201. Internet 202 is an example of a data communication network suitable for exchanging data between components of the present invention. While Internet 202 is an example of a public IP-based network, a suitable public, private, or hybrid network or internetwork topology including LANs, WANs, and MANs are suitable equivalents in most applications.

Voice portal 110 comprises speech-enabled application 204 and speech recognition (SR) front-end 203. Application 204 implements desired fundamental behaviors of the application, such as looking up telephone numbers, weather information, stock quotes, addresses and the like. Speech enabled application has an interface that couples to SR front end 203. This interface may be configured to receive voice-format data such as phoneme probabilities or text input, but may also be configured to receive commands or other structured input such as structured query language (SQL) statements.

Front-end 203 implements a defined interface that is protocol compliant with network 201 to communicate request and response traffic with voice appliances 102. SR front-end 203 receives requests from voice appliances 102 where the requests identify the speaker and include a voice signal. SR front-end generates a request to speech server 101 to access shared resources 105 needed to process the voice signal so as to generate input to speech enabled application 204. The processing responsibilities between SR front-end 203 and speech server 101 are agreed upon in advance, but can be varied significantly. In a particular example, the requests from SR front end 203 include a digitized speech signal, and the responses from speech server 101 include a set of phoneme probabilities corresponding to the speech signal.

It is contemplated that a typical system will involve multiple SR front-end devices 203 communicating simultaneously with a single speech server 101. Each front end 203 may handle multiple voice appliances 102 simultaneously. One advantage of the present invention is that centralized speech server 101 can be configured to process these requests in parallel more readily than could individual voice appliances 102. In such cases, requests to speech server 101 are preferably accompanied by a source identification that uniquely identifies a particular SR front-end 203 and a stream identifier that uniquely identifies a particular voice session that is using the identified SR front end 203. In some cases the speaker ID can also be used to identify the session, although when a particular voice appliance 102 is conducting multiple simultaneous sessions, the speaker ID alone may be an ambiguous reference. This information can be used to route the resources 105 to appropriate processes that are using the resources.

SR front end 203 exchanges request/response traffic with speech server 101 over the Internet 202 in the example of FIG. 2. The request/response traffic comprises hypertext transfer protocol (HTTP) packets over TCP/IP in the particular example, although other protocols are suitable and may be preferable in some instances. For example, universal datagram protocol (UDP) can be faster, although offers poorer reliability. The benefits of various protocol layers and stacks are well known and readily consulted in the selection of particular protocols.

Voice resources 105 comprise speaker-dependent signatures 207 and speaker group signatures 208 in a particular embodiment. Speaker-dependent signatures 207 comprise one or more voice models associated with a particular speaker. In contrast, speaker group signatures 208 comprise one or more voice models that are associated with a group of speakers such as English speaking children from Phoenix, Ariz., rather than a particular speaker. Group signatures are a useful middle ground where a particular speaker cannot be identified with certainty, but the speaker can be identified generally as a member of a particular speaker group.

The voice models essentially implement a mapping between voice signals and symbols, words, word portions (e.g., N-grams), phonemes, commands, statements, and the like (collectively referred to as "tokens") that have meaning to one or more speech enabled applications 204. This mapping can be implemented in a variety of data structures such as lookup tables, databases, inverted indices as well as other data structures that enable mapping functionality. In a preferred implementation the mapping is captured in a neural network training file that can be used to enable an artificial neural network to output appropriate tokens in response to voice signal inputs.

An optional feature in accordance with the present invention is the inclusion of signature caches 205 and/or 206. Signature cache 205 is useful in environments where a given speaker or set of speakers frequent the SR front end 203, yet the SR front end 203 still requires general purpose adaptability to any speaker. For example, the speech enabled application may provide services to a single speaker for an extended period of time ranging from a few minutes to days. In such cases, SR front end 203 can implement processes to search its own cache 205 for matches to a voice signal thereby avoiding repeated reference to speech server 101. An SR front end 203 that uses a cache will typically exhibit somewhat greater complexity to implement processes that manage the cache, and that use the cache content instead of services provided by speech server 101. Each cache entry within signature cache 205 may include, for example, a speaker identification, and an association between a particular voice signal and a token corresponding to the voice signal. When SR front end 203 receives a new speech signal, it checks cache 205 for a matching speech signal and returns the token (e.g., a set of phoneme probabilities) without having to access speech server 101. When a speech signal does not find a match in cache 205, a conventional reference to speech server 101 is performed.

Similarly, some voice appliances 102 may benefit by caching signatures in signature cache 206. For example, a home telephone set or office workstation may be used by a small number of speakers frequently, yet still be available for use by other speakers. The voice resources corresponding to the frequent speakers are cached locally in signature cache 206. When one of the frequent speakers uses the voice appliance 102, voice services can be implemented within the appliance 102 itself. However, when an infrequent (i.e., uncached) speaker uses the appliance 102, voice resources are either downloaded to the appliance 102, or to an SR front end 203. Such functionality enables a rather simple, lightweight voice recognition system implemented within an appliance 102 to offer high quality, speaker dependent functionality without training, assuming speech server 101 contains signatures corresponding to the speakers.

FIG. 3 shows an exemplary format of a request made from SR front end 203 to speech server 101. Each request includes a speaker ID, source address identifying a particular SR front end 203, optional context information, and a voice signal. The context information may include information about the application 204, information about the speaker (e.g., age, language, accents), speaker location, information about the voice appliance 102, or a stream ID for multiprocessing. The context information is used to adapt the processes undertaken in speech server 101. The voice signal field includes all or a portion of a voice signal to be processed. It is contemplated that some applications may be configured such that voice processing occurs in the front end 203 or within voice appliance 102. In these cases, the voice signal field includes processed data structures such as the output of a Fourier transform instead of raw voice data. In such cases, it may not be necessary to send the voice signal to speech server 101 at all, instead, speech server 101 serves to supply the raw speaker-dependent resources needed to SR front end 203 and/or voice appliance 102.

Figure 4:
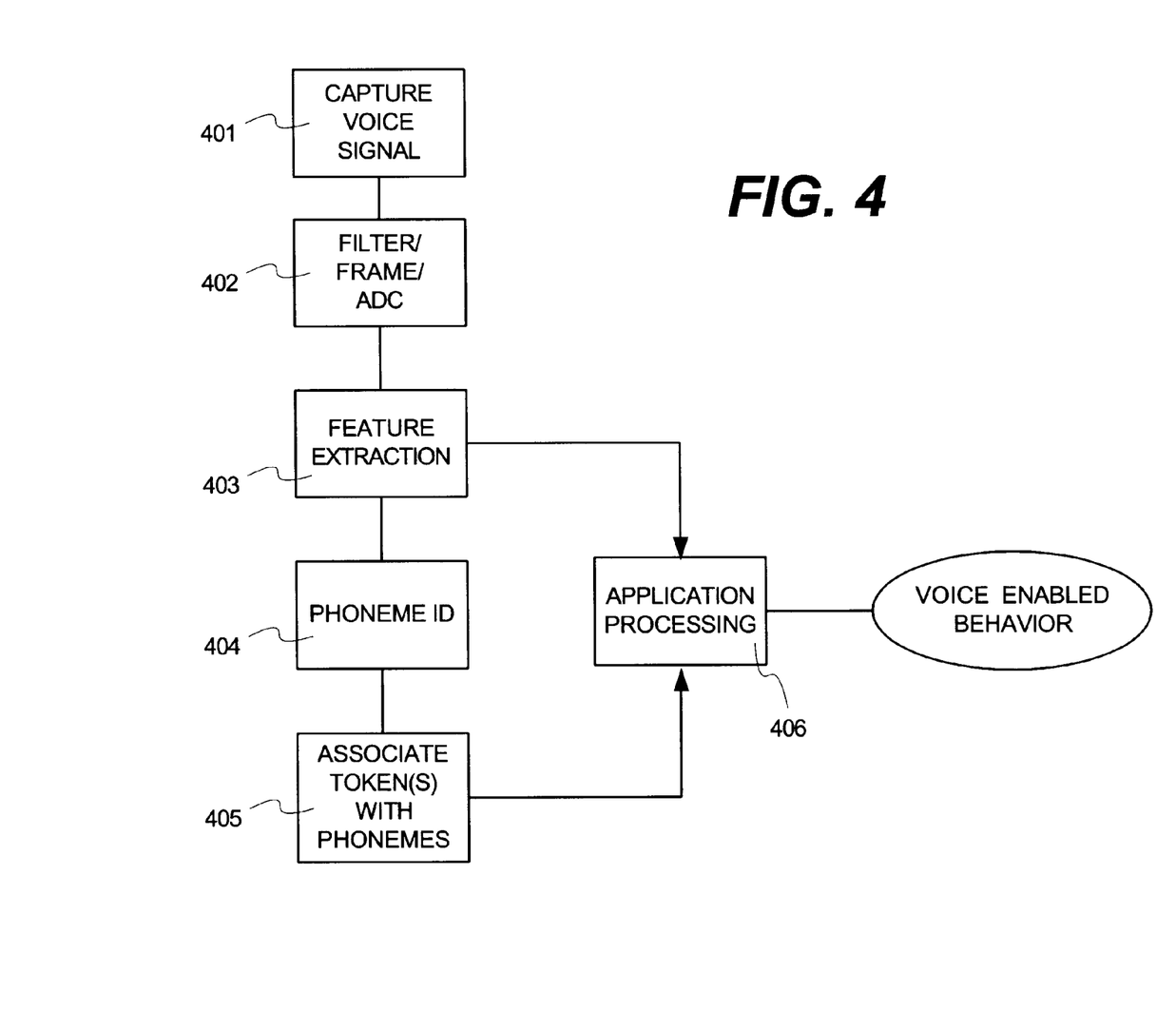
FIG. 4 shows a flow diagram of processes involved in an implementation of the present invention.

FIG. 4 shows a simplified flow diagram of processes undertaken within a voice processing system in accordance with the present invention. As noted hereinbefore, the processes shown in FIG. 4 can be distributed throughout the various components shown in FIG. 1 and FIG. 2 or may all be implemented in speech server 101. Step 401 of capturing a voice signal is typically performed by a microphone or other acoustic energy sensor within a voice appliance 102. Filtering, framing, and analog to digital conversion step 402 preferably takes place as close to step 401 as practicable to avoid transmission of analog voice signals. However, it is common to transfer voice signals over great distances using radio and telephony subsystems. Hence, the filtering, framing and ADC step 402 may occur within voice appliance 102, at a device coupled to appliance 102 through a voice or data communication network, or a combination of these locations. Moreover, filtering may be explicitly performed by analog or DSP filter circuits, or implicitly by bandwidth constraints or other transmission channel characteristics through which analog voice signals are passed.

In step 403, features of interest are identified within a voice signal. Features are patterns within the voice signal that have a likelihood of corresponding to phonemes, but phonemes are not directly extracted in step 403. Features may include, for example, mathematical properties such as frequency distribution, amplitude distribution, deviation, and the like of the processed voice signals.

These features can be used to infer or identify phonemes in step 404. Phonemes are abstract units of a phonetic system of a language that correspond to a set of similar speech which are perceived to be a single distinctive sound in the language. Phonemes represent identifiable components within a speech stream that, while they do not have linguistic meaning in themselves, are units with high occurrence within a spoken language. In extracting phonemes from a speech signal, it is rare to make exact matches. It is often useful to associate a probability with one or phonemes indicating a likelihood that the particular phoneme is in fact a correct representation of the speech signal.

Once particular phonemes are identified, they can be used alone or in combination to create associations with tokens such as particular text, commands, or the like in step 405. Step 405 functions to associate the extracted features with tokens. In contrast with features, tokens are abstract units that have linguistic meaning. Words, phrases and punctuation symbols, for example, are tokens that carry linguistic meaning. However, there are a wide variety of more abstract tokens that represent actions, or other complex linguistic structures that are not literally reflected in words of a particular language. For example, a token or set of tokens may represent the concept "search government databases for information about patent litigation involving speech recognition systems", however, the token may be an SQL query, a Java object, an XML document, or other abstraction of the actual verbiage that reflect the concept in the English language. A response is generated to application 204 including the tokens along with identification information that enables the application processing step 406 to associate the tokens with the voice signal that generated the request.

Many applications 204 can use a set of phoneme probabilities, or other feature sets, directly. For example when application 204 is expecting a constrained choice between "yes" and "no", or expecting a single-digit numeric response (e.g., "one", "two", etc.), it is relatively easy to determine the correct token from the feature sets directly. In such cases, the present invention enables the feature extraction process 403 to supply features directly to application processing step 405 such that the step of associating tokens with features can be performed within the application 204 itself. Similarly, some applications may involve supplying phoneme probabilities directly from step 404 so that token association may occur elsewhere. The application processing step 405 implements the voice enabled behavior using the features, phonemes, and/or tokens that it is supplied in steps 403 through 406 respectively.

Figure 5:
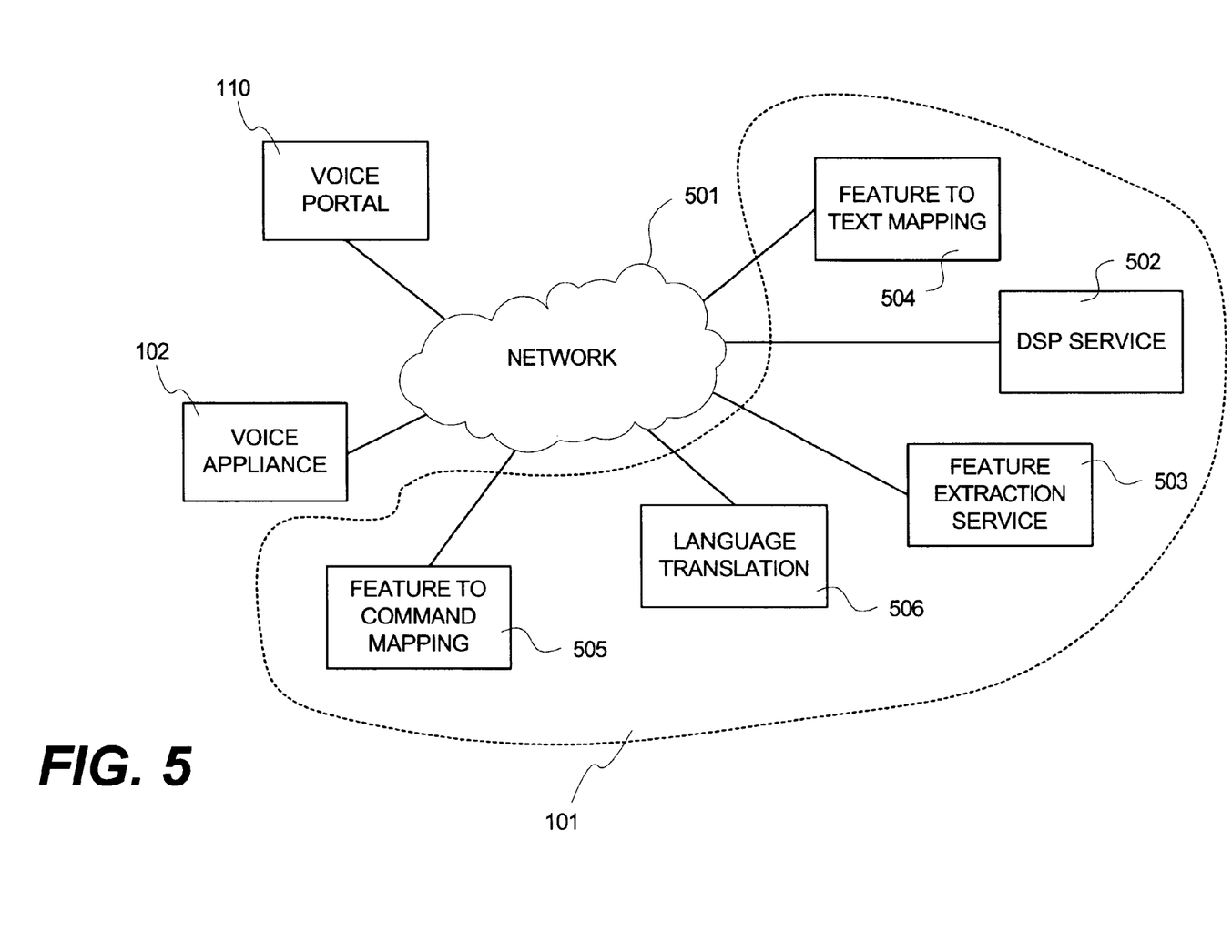
FIG. 5 depicts a distributed service model implementing functionality in accordance with the present invention.

FIG. 5 illustrates an important concept that speech server 101 can be implemented as a distributed computing system using distributed hardware and software resources that are coupled together by network 501. This enables, among other things, the provision of differential levels of service and parallel request processing for improved performance. In one example, the various services shown in FIG. 5 may communicate with each other directly through network 501 to pass a voice processing task from service to service until it is completed. Alternatively, the individual services 502–506 may communicate directly with voice portal 110 and/or voice appliance 102 to perform their functions without knowledge of the other components within speech server 101. In a purely HTTP implementation, the various services can receive an HTTP request, perform their process, and return the partially or completely processed data to the requesting voice portal 110 or voice appliance 102 using HTTP redirection mechanisms as needed, passing the partially processed data as attributes within the HTTP redirection responses.

In the implementation of FIG. 5, speech server 101 comprises signal processing services such as service 502 that provides digital signal processing services. While DSP functionality is often implemented within a voice appliance 102 itself, thin clients may lack the resources to perform DSP processes. Moreover, even where a voice appliance 102 could perform DSP functions, it may be desirable to have DSP service 502 perform the functions to achieve the benefits of faster, more powerful processors and up-to-date algorithms that can be implemented in DSP service 502. DSP service 502 receives a digitized voice signal, for example, and returns a processed digital signal that may implement filtering step 402 (shown in FIG. 4).

Process 503 provides feature extraction services described hereinbefore. Process 504 provides feature to perform, for example phoneme mapping as a specific implementation of step 404 and 405. Alternatively, process 505 provides features and/or phonemes-to-command mapping as an implementation of step 406. A number of processes 505 may be provided for particular applications so that the command mapping is specific to a particular application 204. Requests can be directed to particular instances of process 505 to meet the needs of the application associated with the request.

Language translation process 506 illustrates a more complex voice processing process contemplated by the present invention. Language translation process 506 may receive text from process 504, for example, and perform a language-to-language translation (e.g., English to Spanish). This results in text returned to the requesting voice portal 110 or voice appliance 102 in a different language than was originally spoken. A number of complex services similar to language translation service 506 will be apparent to those skilled in the art. For example, a speakers utterances may be translated into properly formed C++ code constructs as a program authoring tool, properly formed SQL queries to be applied to a database, and the like.

Figure 6:
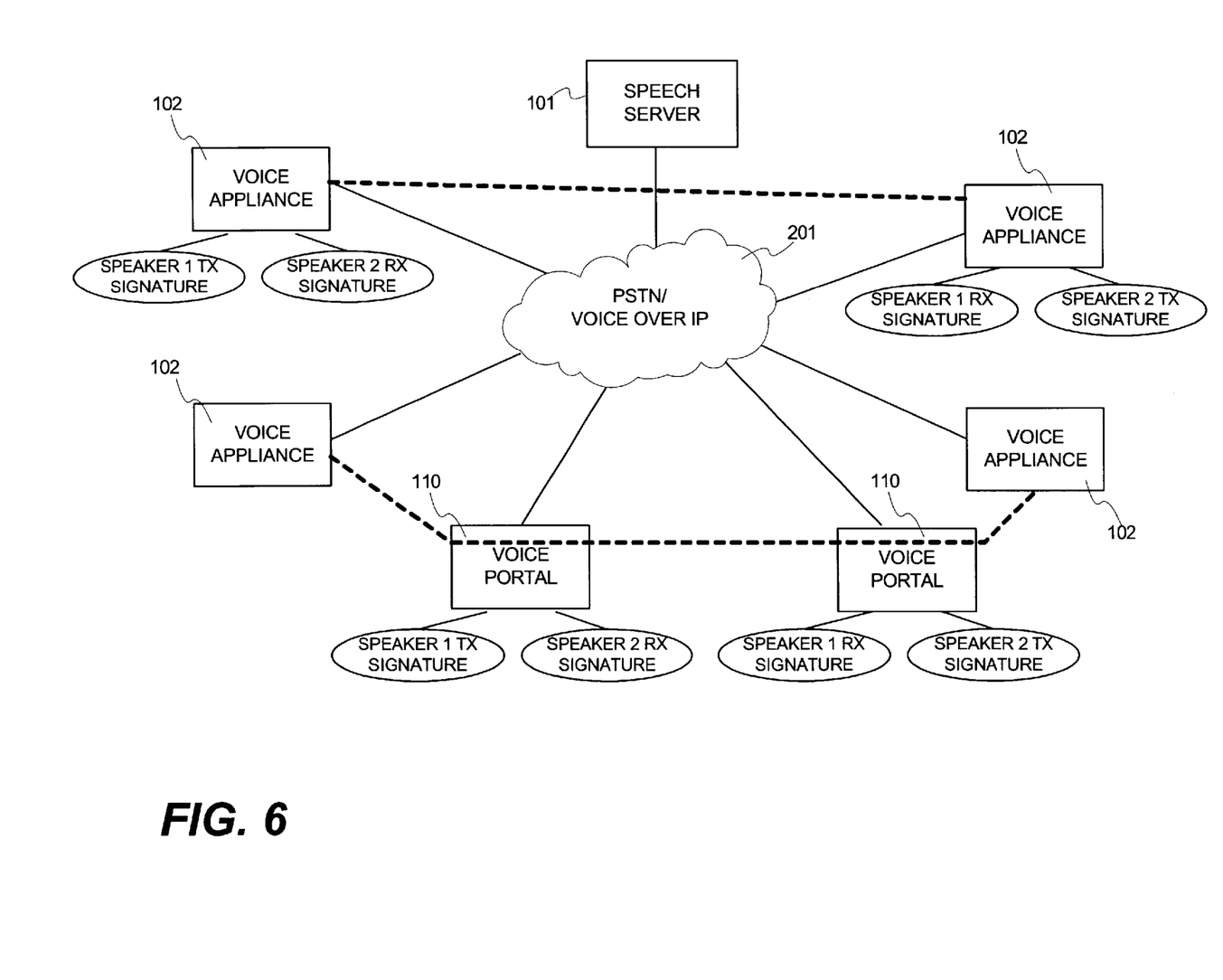
FIG. 6 illustrates an embodiment in which station-to-station duplex voice exchange is implemented.

To this point, the present invention has been described as a mechanism to receive speech signals and translate them into some other meaningful form. Additionally, it is contemplated that speech services 101 may also provide services that convert abstract tokens into speech signals that can be audibly presented through an appliance 102 having a speaker. FIG. 6 illustrates an embodiment in which station-to-station duplex voice exchange is implemented between voice appliances 102 in a manner that is functionally analogous to conventional telephone service.

Conventional phone service provides a medium in which all parties to a conversation hear a voice that sounds substantially like the speaker. Although conventional telephone service limits audio bandwidth to reduce the amount of data that is being transported, it remains a very inefficient means to communicate voice information between two points. The implementation of the present invention shown in FIG. 6 enables high levels of compression while retaining the benefits of conventional phone service.

In general, the embodiments shown in FIG. 6 use speaker-dependent voice models or signatures to be used to compress the audio information that is transmitted between stations. Each speaker is associated with a TX signature used to convert the speaker's voice into tokens (as described hereinbefore), and an RX signature used to convert tokens into a replica of the speaker's voice. The RX signatures are akin to TX signatures in that they implement mappings between tokens and voice signals using either mapping data structures and algorithms, or neural networks, or both.

In a first implementation shown in the upper portion of FIG. 6, each appliance 102 implements processes to use speaker dependent signature files to encode and decode voice signals. The appliance 102 used by speaker 1, for example, includes a TX signature file for speaker 1, and an RX signature file for speaker 2. The appliance 102 used by speaker 2, conversely, includes a TX signature file for speaker 2, and an RX signature file for speaker 1. At the appliance 102 operated by speaker 1, speaker 1's voice is encoded to tokens and tokens received from the appliance 102 operated by speaker 2 are decoded into audible speech signals that can be presented through a speaker. Conversely, at the appliance 102 operated by speaker 2, speaker 2's voice is encoded to tokens and tokens received from the appliance 102 operated by speaker 1 are decoded into audible speech signals that can be presented through a speaker. In this manner, station-to-station voice communication is enabled with highly compressed data communication between the stations.

In an alternative implementation shown in the lower portion of FIG. 6, appliances 102 communicate through voice portals 110 such that some or all of the voice processing functions required to associate voices signals with tokens are performed by the voice portals 110. In such as case, voice appliances 102 may be substantially conventional telephone sets. Voice portals 110 perform the token to voice signal mapping functions transparently and communicate voice signals with the respective voice appliances 102. The communication between voice portals 110, however, can be compressed as described above greatly reducing the overall network bandwidth consumed by a given station-to-station voice communication.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of speech recognition comprising the acts of:
   receiving speech signals into a front-end processor;
   storing at least some speaker-dependent and/or speaker group-dependent resources used for speech recognition in a network-attached server, including resources that implement a mapping between the speech signals and tokens that have mean ing to a voice enabled application;
   coupling the front-end processor to the network-attached server over a network to perform the speech recognition using the resources.

2. The method of claim 1 wherein the front-end processor comprises an untrained and/or minimally trained voice recognition system whereby the resources provided by the network-attached server provide training for the minimally trained voice recognition system.

3. The method of claim 1 further comprising identifying a speaker in the front-end processor.

4. The method of claim 1 wherein the stored resources comprise a speaker signature data structure comprising at least one speaker dependent voice model.

5. The method of claim 1 further comprising the acts of:
   transmitting the speech signal to the network-attached server; and
   performing speech recognition of the speech signal in the network-attached processor.

6. The method of claim 5 further comprising the acts of:
   returning a response from the network-attached server over the network to the front-end processor comprising phoneme probabilities corresponding to the speech signal.

7. The method of claim 5 further comprising the acts of:
   returning a response from the network-attached server to the front-end processor comprising text corresponding to the speech signal.

8. The method of claim 1 wherein the front-end processor comprises a trainable neural network and the stored resources comprise a neural network training file.

9. The method of claim 1 wherein the stored resources comprise voice signal:value pairs associating a particular value with each voice signal.

10. A speech recognition server comprising:
    a network interface configured to receive a request from an external entity;
    an identification of a speaker associated with each request;
    speaker-dependent signature data structures stored in the speech recognition server; and
    means for generating a response including speaker-dependent voice recognition resources in response to the received request, wherein the voice recognition resources are used by the external entity to perform speech recognition.

11. The server of claim 10 further comprising encoded speech signals within each request.

12. The server of claim 11 wherein the means for generating a response comprises a neural network operable to receive the encoded speech signals and generate an output comprising values representing the language-based content of the encoded speech signals.

13. The server of claim 11 wherein the response includes phoneme probabilities corresponding to the speech signal.

14. The server of claim 11 wherein the response includes text corresponding to the speech signal.

15. The server of claim 10 further comprising speaker group signature data structures stored in the speech recognition server, wherein the means for generating a response includes the speaker group resources when speaker-dependent resources are not available.

16. The server of claim 10 wherein the means for generating a response generates a response including a voice model corresponding to the identified speaker.

17. The server of claim 10 further comprising:
    an interface for receiving a feedback message corresponding to a response, the feedback message indicating whether the voice recognition resources supplied in the response were useful; and
    processes executing within the server for adapting the speaker dependent signature data structures in response to the feedback message.

18. A speech recognition system comprising:
    a centralized resource of shared, speaker-dependent speech recognition resources;
    two or more applications having processes for receiving a voice signal and communicating with the centralized resource over a network to perform speech recognition on the voice signal using the speech recognition resources from the centralized resource.

19. The speech recognition system of claim 18 wherein the speaker-dependent speech recognition resources comprise voice models of individual speakers.

20. The speech recognition system of claim 18 wherein the speaker-dependent speech recognition resources comprise voice models of groups of speakers.

21. The speech recognition system of claim 18 wherein the speaker-dependent speech recognition resources comprise feature extraction processes.

22. The speech recognition system of claim 21 wherein the speaker-dependent speech recognition resources comprise processes operable to associative linguistic tokens with the extracted features.

23. The speech recognition system of claim 18 wherein the speaker-dependent speech recognition resources comprise speech samples for individual speakers.

24. The speech recognition system of claim 18 further comprising:

a feedback message generated by one of the applications to the centralized resource, the feedback message indicating efficacy of the shared speech recognition resource; and processes within the centralized resource operable to use the feedback message to adapt the shared speech recognition resource to improve efficacy.

25. A speech-enabled software application comprising:

a first interface for receiving a voice signal from a speaker;

a second interface for sending the voice signal over a network to a centralized speech recognition server;

a third interface for receiving phoneme probabilities from the speech recognition server corresponding to the voice signal; and processes for using the phoneme probabilities to launch speech-enabled functions for the speaker.

26. A method of creating a speech sample database comprising:

accepting a voice recognition task at an application;

communicating the voice recognition task to a centralized resource;

performing the voice recognition task at a the centralized resource;

causing the application to evaluate correctness of the voice recognition; and storing the speech sample from the task with its recognition result in a speech sample database.

27. The method of claim 26 further comprising storing context information metadata describing the speaker with an association to the sample.

28. The method of claim 26 further comprising providing speech samples meeting specified criteria to external entities.

* * * * *